United States Patent
Dong et al.

(10) Patent No.: US 7,582,170 B2
(45) Date of Patent: Sep. 1, 2009

(54) METHOD FOR MICROMACHINING METALLIC MATERIALS

(75) Inventors: Juan Dong, Bremen (DE); Ralf Gläbe, Bremen (DE); Andreas Mehner, Bremen (DE); Ekkard Brinksmeier, Bremen (DE); Peter Mayr, Osterholz-Scharmbeck (DE)

(73) Assignee: Stiftung Institut fur Werkstofftechnik, Bremen (DE)

( * ) Notice: Subject to any disclaimer, the term of this patent is extended or adjusted under 35 U.S.C. 154(b) by 187 days.

(21) Appl. No.: 10/565,925

(22) PCT Filed: Jun. 12, 2004

(86) PCT No.: PCT/EP2004/006365

§ 371 (c)(1),
(2), (4) Date: Aug. 21, 2006

(87) PCT Pub. No.: WO2005/019488

PCT Pub. Date: Mar. 3, 2005

(65) Prior Publication Data

US 2006/0292397 A1 Dec. 28, 2006

(30) Foreign Application Priority Data

Jul. 24, 2003 (DE) .............................. 103 33 860

(51) Int. Cl.
*C22C 8/00* (2006.01)
*C22C 22/00* (2006.01)

(52) U.S. Cl. ...................................... 148/219; 148/318

(58) Field of Classification Search ............. 65/374.11; 148/219, 318
See application file for complete search history.

(56) References Cited

U.S. PATENT DOCUMENTS 5,171,348 A * 12/1992 Umetani et al. .......... 65/374.11
5,905,571 A * 5/1999 Butler et al. ................. 356/328

FOREIGN PATENT DOCUMENTS

| DE | 19629456 C1 | 11/1997 |
| DE | 19840738 A1 | 3/2000 |
| GB | 2384734 A | 8/2003 |

OTHER PUBLICATIONS

German Search Report, Dec. 27, 2008.
International Search Report/Written Opinion for Priority PCT/US2004/006365, Mar. 11, 2005.
Database CA 'Online'—Chemical Abstracts Service, Columbus, Ohio; Gruby, S. V. et al. "Investigation of Precision surfaces after diamond micromachining" ISSN: 0042-4633, 1996.

* cited by examiner

*Primary Examiner*—George Wyszomierski
*Assistant Examiner*—Weiping Zhu
(74) *Attorney, Agent, or Firm*—Laurence P. Colton; Smith, Gambrell & Russell

(57) ABSTRACT

A process for the low-wear micromachining of workpieces made from metal or metal alloys, in particular steel, in which a workpiece (1) is micromachined using at least one machining apparatus (5) that has a diamond tool (6), in particular an ultraprecision turning, milling or grinding machine, and prior to the micromachining the workpiece (1), in a first step, is subjected to a thermochemical surface zone treatment, and that in a second step the thermochemically treated surface zone (2) of the workpiece (1) is machined using the machining apparatus (5).

10 Claims, 1 Drawing Sheet

METHOD FOR MICROMACHINING METALLIC MATERIALS

Figure 1:
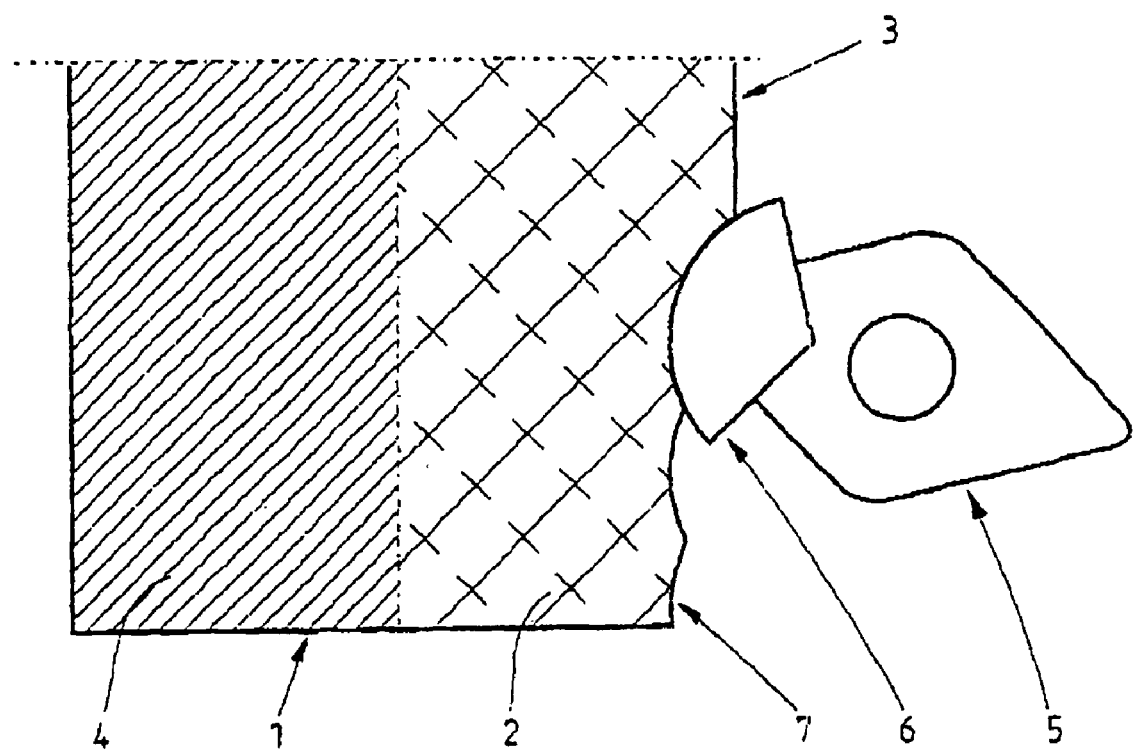

The present invention relates to a process for the low-wear micromachining of workpieces made from metallic materials or metal alloys, in particular steel, in which a workpiece is micromachined using at least one machining apparatus that has a diamond tool, in particular an ultraprecision turning, milling or grinding machine. The invention also relates to a workpiece made from a metal from transition groups IV-VIII or a metal alloy, in particular steel, with a surface which has been machined by micromachining.

In the prior art, micromachining technology is primarily used to machine workpieces made from nonferrous metals. In this case, apparatuses with cutting tools made from monocrystalline diamond are used in what is known as ultraprecision machining. Diamonds have the advantage of having a high thermal conductivity, a low coefficient of friction but in particular an extremely high hardness, so that it is possible to introduce surface structures with accuracies in the micrometer and sub-micrometer range into workpieces made from nonferrous metals using these diamonds in a relatively low-wear manner, with the surface roughnesses achieved during the micromachining being in the range of a few nanometers. In this context, the term "low-wear" refers to the cutting tool itself, i.e. the diamond, the wear to which is the limiting factor on the entire machining process.

Since the very beginning of micromachining technology, there has been a need to increase the range of materials which can be machined. In particular, there is a need to use steel, in all its material variations, in order in particular to be able to make use of the hardness, wear resistance, thermal stability and corrosion resistance of alloyed and unalloyed steels. In the prior art, the micromachining of steel entails extremely major problems, since the diamond tools used, when machining steel, are subject to such high levels of wear that it becomes uneconomical to machine the surfaces of steel workpieces by micromachining.

The high wear to the diamond tool is caused, in addition to the hardness of the steel to be machined, in particular also by the fact that a chemical reaction when the diamond comes into contact with iron (or alloying elements) present in the steel converts the uppermost atomic layers of the diamond into thermodynamically stable but soft graphite.

For many years, there has been intensive research in the field of micromachining aimed at coming to terms with the problem of the high level of wear to the diamond tools used. Various approaches have been pursued. Inter alia, ultrasonic excitation has been superimposed on the movement of the diamond tool in order to minimize the contact time between diamond and workpiece to be machined. However, hitherto, the various approaches have not yet led to a breakthrough in the sense of widespread technical implementation.

Therefore, it is an object of the present invention to provide a process for micromachining workpieces made from metal or metal alloys, in particular steel, in which the wear to the diamond tool is considerably reduced compared to the process which has hitherto been known from the prior art. A further object of the invention is to provide workpieces made from metal or metal alloys, in particular steel, which have been machined using a low-wear micromachining process.

The object according to the invention is achieved by a process for the low-wear micromachining of workpieces made from metal or metal alloys, in particular steel, in which a workpiece is micromachined using at least one machining apparatus that has a diamond tool, in particular an ultraprecision turning, milling or grinding machine, wherein prior to the micromachining the workpiece, in a first step, is subjected to a thermochemical surface layer treatment, and wherein in a second step the thermochemically treated surface zone of the workpiece is machined using the machining apparatus.

In this context, the term "surface zone" of the workpiece is to be understood as meaning the entire region of the workpiece which is close to the surface and can be influenced by thermochemical processes.

The main effect, i.e. the very great reduction in wear, is achieved by the process according to the invention if the depth of cuts introduced into the workpiece using the diamond tool is less than the thickness of the thermochemically treated surface zones, since in this case work is carried out completely and exclusively in this surface zone. In this case, the diamond tool is in contact only with the treated surface zone material. However, it is also within the scope of the invention for the diamond tool to penetrate slightly into the untreated region of the workpiece, although this is at the expense of the wear reduction which can be achieved.

At present, it has not been definitively explained precisely what microphysical and chemical processes for reducing wear to the diamond are the factors underlying the process according to the invention. According to a first explanation model, the novel process reduces the affinity of the chemical elements present in the boundary layer to be machined—usually the iron in steel—for diamond, in such a manner that graphitization of the diamond takes place to a considerably lesser extent during the subsequent micromachining than without the thermochemical treatment according to the invention. Consequently, the wear to the diamond tool is considerably reduced. In the context of the present invention, it is possible to achieve cutting edge wear which is at least two orders of magnitude lower than when machining a material which has not been thermochemically treated.

In the context of the present invention, the term micromachining is to be understood as encompassing all machining processes of this type, including conventional machining processes, the resulting workpieces produced by which have a high shape, dimension and surface quality. In particular, the term is to be understood as meaning cutting manufacturing processes, such as for example turning, milling or grinding.

The workpiece which is to be machined may in this case consist of transition metals from transition groups IV-VIII, in particular iron, nickel, chromium, vanadium, molybdenum, titanium, tungsten, cobalt, or an alloy based on these metals, also produced by sintering. All steel grades, under certain circumstances as alloys based on these metals, are likewise included.

With regard to the diamond tool used in the machining apparatus, this tool usually has a monocrystalline diamond as cutting material. Alternatively, it is also possible for polycrystalline diamond or a diamond-coated substrate plate—for example made from hard metal—to be used as cutting material. Furthermore, the cutting material may also be composed of monocrystalline or polycrystalline CBN or a CBN-coated substrate plate.

The thermochemical surface layer treatment advantageously introduces in particular an element such as nitrogen, boron, carbon, phosphorous, sulfur or oxygen or a combination of these elements into the workpiece surface zone, usually by a process such as nitriding, boronizing, nitrocarburizing, carbonitriding, carbonizing, phosphating or oxidizing or a combination of these processes. Moreover, all thermochemical processes which lead to the desired result, namely a reduction in the wear to the diamond tool, are conceivable.

If the thermochemical surface layer treatment is nitriding, processes such as gas nitriding, salt bath nitriding, plasma nitriding or laser nitriding are recommended.

For the other thermochemical processes, processes carried out under a gas atmosphere with and without plasma enhancement, in particular plasma carburizing or plasma boronizing, are likewise recommended.

The object of the present invention is also achieved by a workpiece made from a metal or a metal alloy, in particular steel, with a surface which has been machined by micromachining, the workpiece having a surface zone formed by a thermochemical surface treatment, such as nitriding, boronizing and the like.

It is particularly economically expedient if the workpiece is a molding tool for optical mold making, in particular for the production of aspheric optics, optical components with free-form surfaces and prism arrays made from plastic or glass. Particularly in optical mold making, it is attempted to produce molding tools for the production of complicated optics from durable material, such as tool steel. Prior to this invention, this was only possible at high cost.

However, the workpiece may also be a precision mechanical component, in particular a bearing shell for air bearings, a valve seat for highly loaded hydraulic actuators, a highly loaded precision guide element, a bearing shell for high-precision ball bearings or a corrosion-resistant metal mirror. Of course, the invention is not restricted to these examples which have been listed.

Further features of the invention will emerge from the following description of an exemplary embodiment with reference to the appended drawing and from the accompanying subclaims. In the drawing:

FIG. 1 shows an outline sketch of a face-turning operation carried out on a thermochemically treated workpiece.

A micromachining treatment of workpieces made from steel using diamond tools is not usually possible in the prior art on account of wear to the diamond tool caused by graphitization of the diamond during the machining. To reduce this wear, the workpiece made from steel is nitrided prior to the machining operation.

In the present specific exemplary embodiment, in a first step a workpiece 1—a round blank with a diameter of approx. 60 mm made from steel material Ck45N—is gas-nitrided for approx. five hours at a temperature of 550° C. During the gas-nitriding, nitrogen penetrates into the workpiece 1, after which the latter forms a surface zone 2 of nitrided steel material which extends from the unmachined surface 3 of the workpiece 1 into the workpiece 1.

This surface zone 2 is adjoined by an untreated basic microstructure zone 4 of unaltered Ck45N, which has not been affected by the gas-nitriding on account of its depth in the workpiece 1.

In a second step, the workpiece 1 is face-turned so as to produce a surface 7 of optical quality. A part 5 of an ultraprecision turning machine with diamond cutter 6 is diagrammatically depicted. The diamond cutter 6, to machine the surface or surface region of the workpiece 1, penetrates into the thermochemically treated surface layer 2 of the workpiece 1.

A monocrystalline diamond is used for the diamond cutter 6.

In other words, the nitrided surface layer 2 can be machined with considerably reduced wear to the diamond cutter 6, and even structures of optical surface quality can be machined into the surface layer 2.

As is known in connection with the nitriding of steel, the hardness of the workpiece 1 is higher in the surface zone 2 than in the inner, untreated region of the workpiece, i.e. the basic microstructure zone 4. Therefore, the properties, in particular hardness, wear resistance and corrosion resistance, are improved in the region of the surface layer following the nitriding operation compared to the starting state.

The process according to the invention can achieve roughnesses of as little as Ra≈10 nm. Subsequent manual polishing reduces the roughness to Ra≈5 nm.

LIST OF REFERENCE SYMBOLS

1 Workpiece
2 Surface zone
3 Unmachined surface
4 Basic microstructure zone
5 Part of an ultraprecision turning machine
6 Diamond cutter
7 Surface of optical quality

The invention claimed is:

1. A process for the low-wear micromachining of workpieces made from metallic materials or metal alloys in which a workpiece (1) is micromachined using at least one machining apparatus (5) that has a diamond tool (6), comprising the steps of:
   a) prior to the machining, subjecting a surface region of the workpiece (1) to a thermochemical surface layer treatment so as to create a thermochemically treated surface zone (2) within the surface region of the workpiece (1) by introducing a selected element or combination of elements to the surface region of the workpiece (1) and by allowing the selected element or combination of elements to penetrate into the surface region of the workpiece (1) so as to create the thermochemically treated surface zone, and
   b) machining the thermochemically treated surface zone (2) of the workpiece (1) using the machining apparatus (5).

2. The process as claimed in claim 1, wherein the workpiece (1) consists of a metal from transition group IV-VIII.

3. The process as claimed in claim 1, wherein the thermochemical surface treatment introduces at least boron, nitrogen, carbon, oxygen, phosphorus, sulfur into the thermochemically treated surface zone (2).

4. The process as claimed in claim 1, wherein the thermochemical surface zone treatment is selected from the group consisting of nitriding, nitrocarburizing, carbonitriding, boronizing, carburizing, oxidizing, and a combination of these processes.

5. The process as claimed in claim 1, wherein the thermochemical surface zone treatment process is selected from the group consisting of gas nitriding, gas carbonitriding, bath nitriding, plasma nitriding, and laser nitriding.

6. The process as claimed in claim 1, wherein the machining step introduces cuts into the workpiece (1), and the depth of the cuts introduced into the workpiece (1) using the diamond tool (6) is less than the thickness of the thermochemically treated surface zone (2).

7. The process as claimed in claim 1, wherein the metallic materials or metal alloys is steel.

8. The process as claimed in claim 1, wherein the machining apparatus (5) is selected from the group consisting of ultraprecision turning, milling and grinding machines.

9. The process as claimed in claim 2, wherein the metal is selected from the group consisting of iron, nickel, chromium, vanadium, molybdenum, titanium, tungsten, cobalt, and alloys thereof.

10. The process as claimed in claim 9, wherein the metal is produced by sintering.

* * * * *